(12) United States Patent
Farina

(10) Patent No.: US 6,595,535 B2
(45) Date of Patent: Jul. 22, 2003

(54) BICYCLE OR THE LIKE

(75) Inventor: Ernesto Farina, Sora (IT)

(73) Assignee: E.R.L. Invenzioni S.r.l., Sora (IT)

( * ) Notice: Subject to any disclaimer, the term of this patent is extended or adjusted under 35 U.S.C. 154(b) by 0 days.

(21) Appl. No.: 09/600,550

(22) PCT Filed: Jan. 20, 1999

(86) PCT No.: PCT/IT99/00009

§ 371 (c)(1),
(2), (4) Date: Jul. 19, 2000

(87) PCT Pub. No.: WO99/37528

PCT Pub. Date: Jul. 29, 1999

(65) Prior Publication Data

US 2003/0094782 A1 May 22, 2003

(30) Foreign Application Priority Data

Jul. 22, 1998 (IT) ............................ FR98A0009

(51) Int. Cl.⁷ ............................................ B62M 1/00
(52) U.S. Cl. ................. 280/255; 280/253; 280/288.1; 280/288.4
(58) Field of Search ................. 280/252, 253, 280/255, 256, 257, 258, 288.1, 259, 288.4

(56) References Cited

U.S. PATENT DOCUMENTS

| | | | |
|---|---|---|---|
| 579,002 A | 3/1897 | Merrill | |
| 635,683 A | 10/1899 | Herman | |
| 2,023,889 A | * 12/1935 | Kramps | 280/252 |
| 2,225,304 A | * 12/1940 | Killin, Jr. | 280/258 |
| 2,929,641 A | 3/1960 | Alvistur | |
| 3,881,747 A | * 5/1975 | Abbott | 280/255 |
| 4,019,230 A | * 4/1977 | Pollard | 280/255 |
| 4,248,448 A | 2/1981 | Dmitrowsky | |
| 4,411,443 A | * 10/1983 | Pollard | 280/288.2 |
| 4,445,701 A | 5/1984 | Stroud | |
| 4,456,276 A | 6/1984 | Bortolin | |
| D277,744 S | 2/1985 | Traylor | |
| 4,838,568 A | * 6/1989 | Arroyo | 280/252 |
| 4,978,167 A | * 12/1990 | Harvey | 297/195 |
| 4,981,306 A | 1/1991 | Young | |
| 5,351,575 A | * 10/1994 | Overby | 280/257 |
| 5,390,773 A | * 2/1995 | Proia | 280/253 |
| 5,403,027 A | 4/1995 | Hwang | |
| 5,984,335 A | * 11/1999 | Tseng | 280/252 |
| 6,086,079 A | 7/2000 | Farina | |

FOREIGN PATENT DOCUMENTS

| | | | |
|---|---|---|---|
| CH | 236146 | 5/1945 | |
| DE | G 86 14 882.6 | 10/1986 | |
| EP | 0 285 858 A | 10/1988 | |
| EP | DE 41 24 292 A | 3/1992 | |
| FR | 837 231 A | 2/1939 | |
| FR | 1 102 611 S | 10/1955 | |
| FR | 2 483 349 | 12/1981 | |
| IT | 325795 | * 4/1935 | 280/255 |

OTHER PUBLICATIONS

Soviet Patent Abstracts, Week 9240, dated Nov. 18, 1992, by Derwent Publications, Ltd., London, which is an abstract of Soviet Patent Publication No. SU 1698123A, published on Dec. 15, 1991.

* cited by examiner

*Primary Examiner*—Daniel G. DePumpo
(74) *Attorney, Agent, or Firm*—Smith, Gambrell & Russell (57) ABSTRACT

The invention relates to a bicycle and like, having a rear wheel (22) or flywheel, and provided with a pedal group comprising a central shaft and a gear wheel (5) integrally coupled each other, a left crank (1) and a right crank (1), coupled on the two ends of the central shaft, characterised in that a pedal crank (7) is rotatably coupled with each one of said left and right cranks (1) by mechanical means (6, 8, 10) creating a freewheel like mechanism between the crank (1) and the corresponding pedal crank (7), a pedal (12) being coupled with one end of each one of the two pedal cranks (7).

41 Claims, 12 Drawing Sheets

BICYCLE OR THE LIKE

The invention relates to bicycles, meaning with the term "bicycle" any apparatus, mobile or fixed, provided with a pedal group operated by the user of the bicycle, as, for instance, bicycles for touring and for racing, tandem, exercise bikes (cyclette), tricycles.

More particularly, the invention relates to bicycles of the above kind provided with an innovative pedal group able to assure high biomechanical efficiency of the user's action, to promote the generation of high power during the operation of the pedal group, to allow the user to assume a posture anatomically favourable for the operation of the pedal group, to warrant a very good balancing of the user's weight and to assure a considerable stability to (mobile) bicycle during motion.

Moreover, the invention relates to bicycles of the above kind provided with an innovative seat able to allow the user to assume a comfortable posture.

Common bicycles presently on the market provide that the pedal group comprises a central shaft, two cranks coupled with the shaft, a pedal coupled with the end of each one of the two cranks and a gear wheel, integrally coupled with the cranks, for transmitting to a chain the motion of the cranks generated by the user through the action of the feet on the pedals. The seat on which the user is sitting during operation of the pedal group is placed at the back of, but substantially in proximity to, the perpendicular to the ground going through the shaft of the pedal group. In the case of mobile bicycles, there are (at least) one front wheel and (at least) one rear wheel having a central hub provided with a freewheeling sprocket to which the chain motion is transmitted in only one way. In the case of fixed bicycles, as cyclette, instead of the wheels, there is (at least) one flywheel, preferably at the back, which offers resistance to the user's action and to which motion is transmitted similarly to the transmission in mobile bicycles.

As it is known by those skilled in the art, the typology and the position of the pedal group and of the seat of the present bicycles force the user to operate the pedal group assuming a substantially sitting or forward bent position that involves some drawbacks.

First of all, the muscular work of the user's lower limbs has a non optimal biomechanical efficiency. In fact, this is heavily lowered by the counter-gravity work carried out by the limbs during the pedalling passive phase, by the incomplete extension of the hips, due to the forward position of the pedal group compared to the seat, and by the very low participation of the muscles of the legs, but the quadriceps, in the pedalling active phase.

Moreover, the sitting or forward bent position assumed by the user involves an increased abdominal pressure, known as Valsalva's phenomenon, due to the reduction of the abdominal cavity, which causes a reduced venous and lymphatic drainage, a reduced pulmonary excursion resulting from the lifting of the diaphragm and a constant stress even of the musculature of user's bust and arms which gives rise to a rapid fatigue, emphasised in mobile bicycles by the presence of even small unevenness of the run ground.

It is the object of this invention, therefore, to furnish a bicycle allowing the biomechanical efficiency of the user's action to be optimised.

It is also object of this invention to furnish a bicycle enabling the generation of a high muscular power during the operation of the pedal group in the pedalling active phase.

It is another object of this invention to improve the balancing of the bicyclist's weight.

It is also object of this invention to furnish a (mobile) bicycle having high stability.

It is further object of this invention to allow the user of the bicycle a comfortable and anatomically favourable for the operation of the pedal group.

It is therefore specific object of the present invention a bicycle and like, having a rear wheel or flywheel, and provided with a pedal group comprising a central shaft and a gear wheel integrally coupled each other, a left crank and a right crank, coupled on the two ends of the central shaft, characterised in that a pedal crank is rotatably coupled with each one of said left and right cranks by mechanical means creating a freewheel like mechanism between the crank and the corresponding pedal crank, a pedal being coupled with one end of each one of the two pedal cranks.

Always according to the invention, said rotating coupling mechanical means between the crank and the corresponding pedal crank can comprise a shaped pin, provided with a ring gear and rotatably coupled with the crank or with the pedal crank, said pin coupling with a corresponding shaped hole provided in the crank or in the pedal crank.

It is further therefore specific object of the present invention a bicycle and like, having a rear wheel or flywheel, and provided with a pedal group comprising a central shaft and a gear wheel integrally coupled each other, a left crank and a right crank, characterised in that said left crank and right crank are rotatably coupled with the central shaft by mechanical means creating a freewheel like mechanism between each crank and the central shaft, a pedal being coupled with one end of each one of the two cranks.

Still according to the invention, said rotating coupling mechanical means between each one of the cranks and the central shaft can comprise a gear coupled with the crank, or to the end of the central shaft, and provided with a shaped hole within which the corresponding end of the central shaft, or a corresponding crank pin, is inserted.

Preferably, according to the invention, in a bicycle having one of the above pedal groups, the central shaft of the pedal group, which is placed parallel with respect to rear wheel hub, is provided externally, above, with respect to the circumference of said rear wheel, within an angle between ±30° with respect to the line passing through the contact point between the wheel and the ground and the hub.

Furthermore according to the invention, the rear wheel or flywheel hub can be coupled with the central shaft of the pedal group by at least a rod.

Always according to the invention, the bicycle can provide at least a further rod connecting the central shaft of the pedal group with the seat supporting rod, said at least a further rod being included within an angle between ±40° with respect to a line parallel to the ground and passing through the central shaft of the pedal group.

Still according to the invention, the bicycle can provide at least a further rod connecting the rear wheel or flywheel hub with the lower end of the seat supporting rod, the angle between said at least a further rod and the line perpendicular to the ground and passing through the rear wheel or flywheel hub being between 60 and 120°.

It is further specific object of the present invention a fixed bicycle, provided with a pedal group operating a rear wheel or flywheel, characterised in that it comprises two tanks, suitable to contain liquid, within each of them a pedal of the pedal group being submerged, within each of the two tanks a cylinder provided with shaped blades and protected by a protection grid being provided, the two cylinders being integrally coupled each other by a shaft inserted within two sealed through holes provided on the faced walls of the two tanks, the shaft centrally providing a bigger diameter disc contacting the rear wheel or flywheel.

Preferably, according to the invention, each one of the two tanks provides a liquid return chute.

It is further specific object of the present invention a bicycle or like, provided with at least one seat coupled with a supporting rod, characterised in that said at least one seat is a swinging seat having a foot pivoted on the head of the supporting rod, the foot being shaped in such a way to provide two surfaces interacting with two mating surfaces of a head projection to limit the rotation with respect to the supporting rod head, elastic means being connected with the seat and the supporting rod.

Always according to the invention, said at least one swinging seat can also comprise a front bodice to support the user bust, said bodice being provided with elastically swinging means.

Still according to the invention, the front bodice can provide a rod, pivoted on the head of the supporting rod and/or on the foot of the seat by said elastically swinging means.

Furthermore, according to the invention, said elastically swinging means can be provided with adjustable friction means able to vary the elastic resistance of the supporting rod opposed by the front bodice to the weight of the supported bust.

Always according to the invention, said at least one swinging seat can provide sliding means to adjust the seat along the longitudinal direction of the bicycle and/or telescopic means to adjust the height and the longitudinal inclination of the seat and/or articulation means to adjust the transverse inclination of the seat.

Still according to the invention, said at least one swinging seat can provide a rear equaliser to support the user bust, said equaliser being provided with elastically swinging means.

Furthermore, according to the invention, the rear equaliser can be connected with the seat and/or with the supporting rod by elastically swinging means.

Preferably, according to the invention, said elastically swinging means provide quick release means.

Always according to the invention, said elastically swinging means can provide adjustable friction means capable to vary the elastic resistance opposed by the equaliser to the user bust.

The present invention will be now described, for illustrative but not limitative purposes, according to its preferred embodiments, with particular reference to the figures of the enclosed drawings, wherein:

FIG. 4a shows a partial, right side perspective view of the bicycle of FIG. 3, schematically representing the lower limbs of a user;

FIG. 4b schematically shows the lower limbs of the user of FIG. 4a;

In the following of the description same references shall be used to indicate same elements in the Figures.

Figure 1:
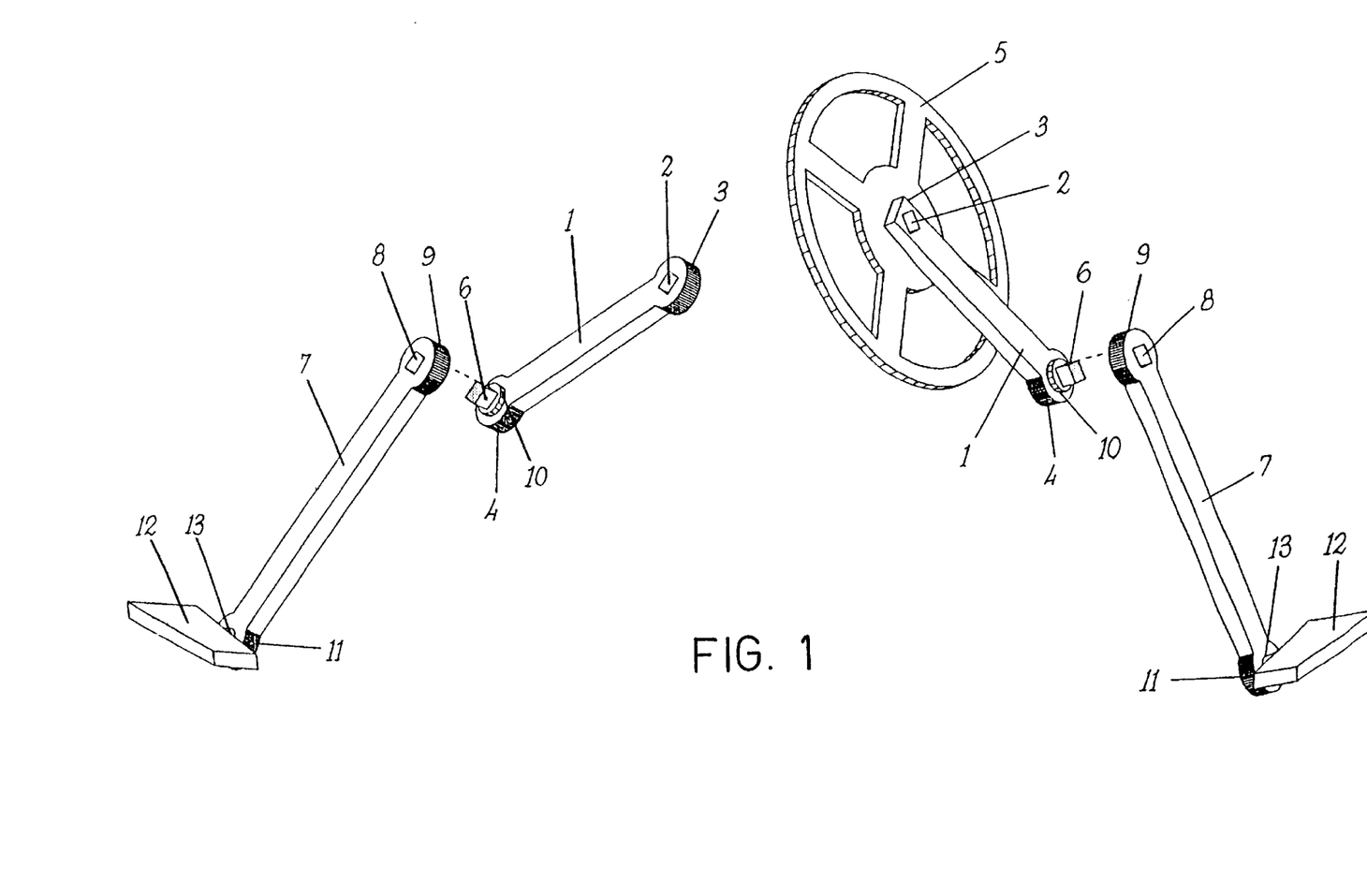
FIG. 1 shows an exploded view of the pedal group of a first embodiment of the bicycle according to the invention.

With reference to FIG. 1, a first embodiment of the bicycle according to the invention provides that the pedal group comprises a left crank and a right crank 1, both coupled, through shaped holes 2 on the ends 3, with the two ends of the central shaft, not shown. With reference to the distance from the shaft, the ends 3 shall be in the following indicated as proximal ends of the crank 1, while the opposite ends 4 shall be indicated as distal ends. A gear wheel 5 is also integrally coupled with the central shaft near the right end. Each one of the two cranks 1 provides that a shaped pin 6, provided with a ring gear 10, is rotatably coupled with the distal end 4.

The pedal group in FIG. 1 further comprises a left pedal crank and a right pedal crank 7 provided with shaped holes 8 on the ends 9. The shaped hole 8 of each one of the two pedal cranks 7 is integrally coupled with the pin 6 of the corresponding crank 1 so as to accomplish a freewheel like mechanism between the crank 1 and the corresponding pedal crank 7. With reference to the distance from the corresponding pin 6, the ends 9 shall be in the following indicated as proximal ends of the pedal cranks 7, while the opposite ends 11 shall be indicated as distal ends. Each one of the two pedal cranks 7 provides that a pedal 12 is coupled with the distal end 11; for instance, the coupling between pedal cranks 7 and pedals 12 may be accomplished through screws, not shown, inserted into threaded through holes 13, placed at the distal ends 11 of the pedal cranks 7, and into corresponding through holes, preferably axial (not shown), of the pedals 12.

The freewheel like mechanism between the cranks 1 and the corresponding pedal cranks 7, accomplished through the integral coupling between the shaped pins 6, provided with the ring gears 10 comprising a plurality of bearings and unidirectional rotating gears, and the shaped holes 8 enables the integral coupling between crank 1 and corresponding pedal crank 7 only during the pedalling active phase, or thrust phase, while during the passive phase, of user's limb reloading phase, the pedal crank 7 is free to rotate in direction opposite to the rotation direction of the corresponding crank 1, allowing the user's foot resting on the pedal 12, coupled with the pedal crank 7, to describe a reduced counter-gravity path. Consequently, the counter-gravity work carried out by the limbs during the pedalling passive phase is hugely reduced, resulting in a high increase of the biomechanical efficiency of the user's action.

It is plain that those skilled in the art may easily modify the coupling between cranks 1 and pedal cranks 7 and/or the position of the ring gears 10 for accomplishing the same freewheel like mechanism between the cranks 1 and the corresponding pedal cranks 7, still remaining within the scope of the present invention.

Figure 2:
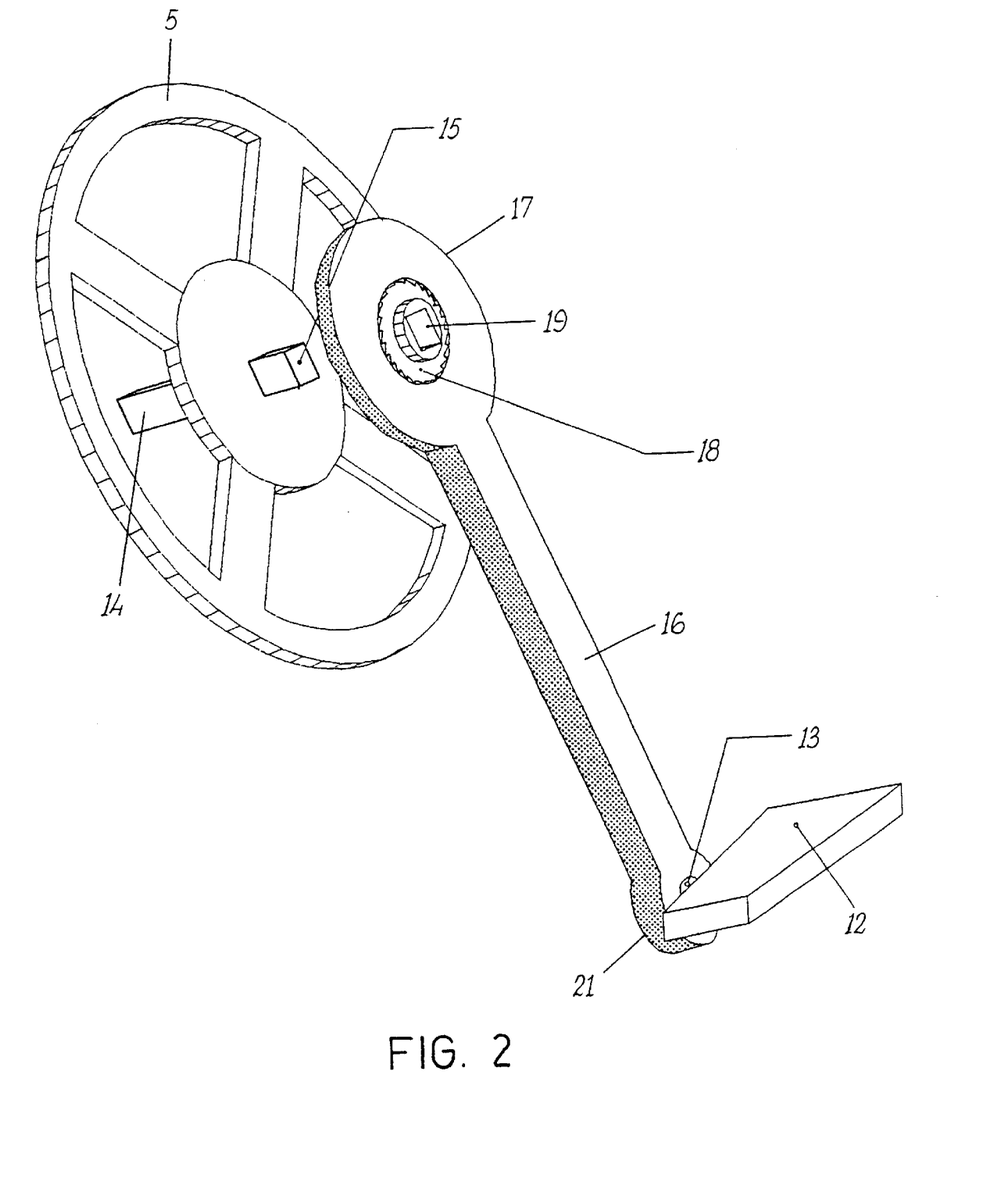
FIG. 2 shows an exploded view of a portion of the pedal group of a second embodiment of the bicycle according to the invention.

With reference to FIG. 2, a second embodiment of the bicycle according to the invention provides that the pedal group comprises a central shaft 14 with which a gear wheel 5 is integrally coupled near the right end 15 (in Figure). The pedal group also comprises two cranks, of which only the right crank 16 is shown; since the cranks are identical, in the following reference shall be made only to the right crank 16, similar considerations being valid also for the left crank. The right crank 16 provides at one end 17 a gear 18 rotatably coupled with the crank itself and provided with a shaped hole 19 into which the right end 15 of the central shaft 14 is inserted for the coupling of the gear 18 with it. The gear 18 is such as to accomplish a freewheel like mechanism between the crank 16 and the central shaft 14.

The right crank 16 provides that a pedal 12 is coupled with the other end, for instance through a screw, not shown, inserted into a threaded through holes 13 and into a corresponding through hole, preferably axial (not shown), of the pedal 12.

The freewheel like mechanism between the right crank 16 and the left one and the central shaft 14 enables the integral coupling between crank 16 and central shaft 14 only during the pedalling thrust phase, while during the user's limb reloading phase the crank 16 is free to rotate in direction opposite to the rotation direction of the central shaft 14, allowing the user's foot resting on the pedal 12 to describe a pendulum path which hugely reduces the countergravity work carried out by the limbs during the pedalling passive phase. Therefore, this involves a high increase of the biomechanical efficiency of the user's action.

It is plain that those skilled in the art may easily modify the coupling between cranks 16 and central shaft 14 and/or the position of the gears 18 for accomplishing the same freewheel like mechanism, still remaining within the scope of the present invention.

Figure 3:
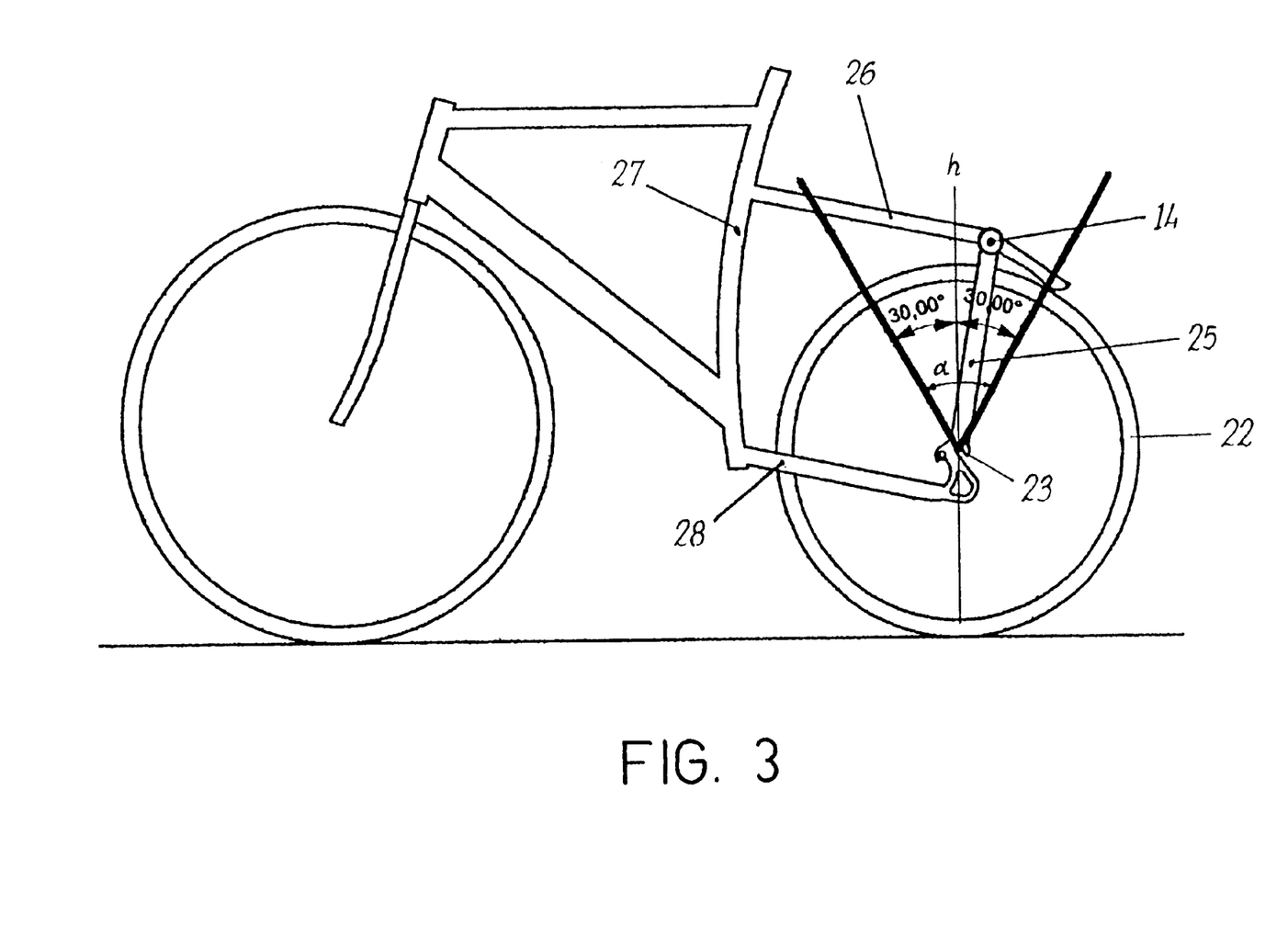
FIG. 3 shows a lateral view of a bicycle according to the invention.

With reference to FIG. 3, a mobile two-wheel bicycle according to the invention provides that the pedal group is placed outside the circumference of the rear wheel 22 in proximity to the perpendicular h to the ground going through the hub 23 of the rear wheel 22. More precisely, the central shaft 14 of the pedal group, set parallel to the hub 23 of the rear wheel 22, is placed externally, above, with respect to the circumference of said rear wheel 22, within an angle α between ±30° with respect to the line h going through the contact point between wheel 22 and ground and the hub 23 of the wheel.

In the case of fixed bicycles, as cyclettes, for which no rear wheel 22 is provided, the central shaft 14 of the pedal group is placed in an equivalent position, for example outside a rear flywheel.

Figures 4A, 4B:
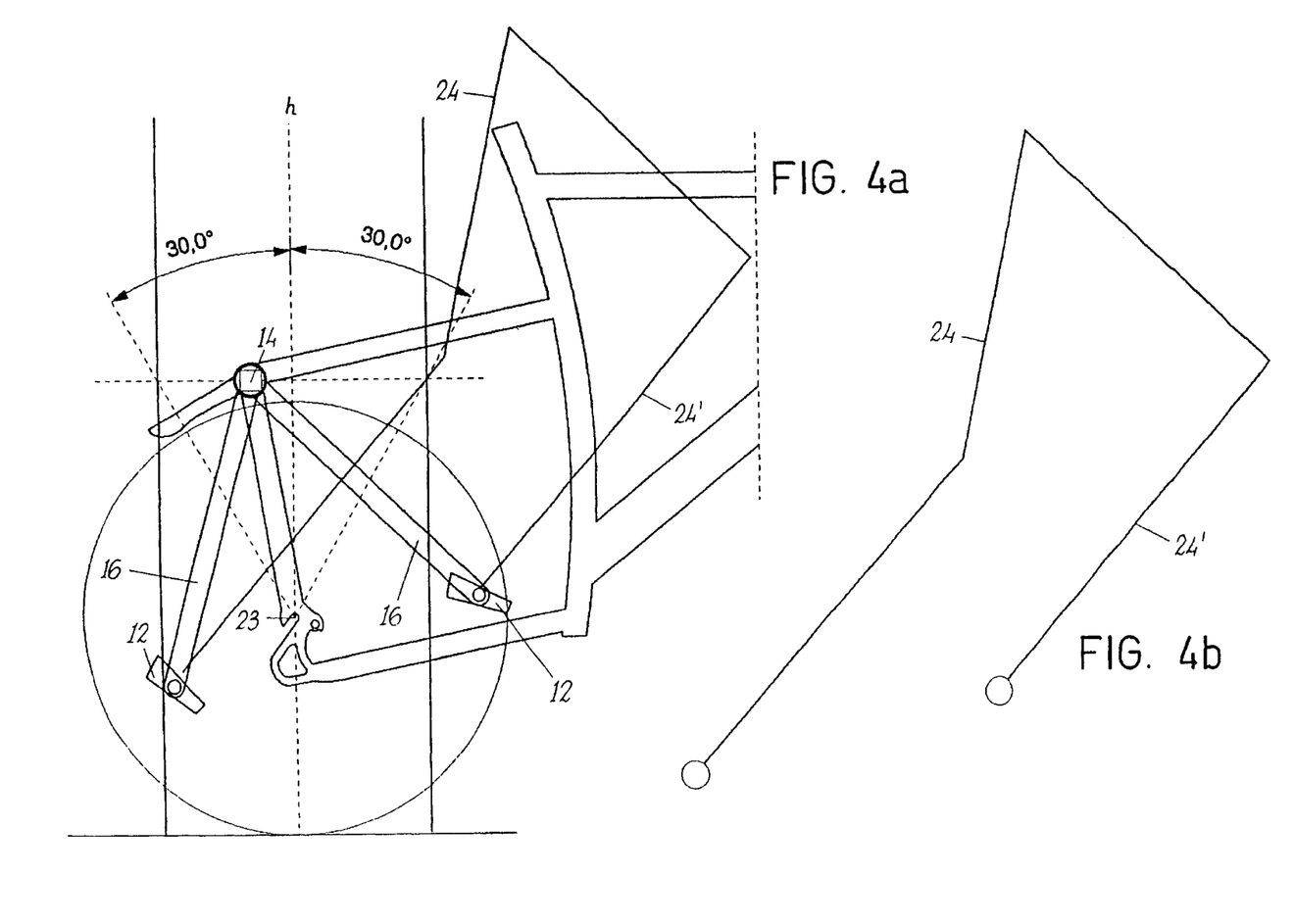

Observing FIG. 4a, which shows a part of the bicycle of FIG. 3 viewed from the opposite side and having the pedal group with pendulum cranks of FIG. 2, it is plain that such position of the pedal group allows all muscles of the lower limbs 24 and 24' to be better used since, as it is better shown in FIG. 4b, the limbs 24 and 24' may be completely stretched during the pedalling active phase, generating a higher muscular power than the one generated in traditional bicycles. Moreover, the position of the pedal group promotes the balancing of the user's weight and the stabilisation of the whole propulsive part of the bicycle, comprising the rear wheel 22 and the pedal group, due to the reduction of the side movement of the pedals; particularly, the stability of the bicycle is furthermore increased with the increasing of speed, due to the effective gyroscopic effect resulting from the shown position of the pedal group. Also, such position of the pedal group allows the user to assume a particularly aerodynamic posture.

It is plain that such advantages are obtained even when the pedal group applied to the bicycle of FIG. 4a is the one with cranks and pedal cranks of FIG. 1.

As it is shown in FIG. 3, the frame of the bicycle provides that the hub 23 of the rear wheel 22 is connected to the central shaft 14 of the pedal group through a first rod 25 which promotes the stabilisation of the propulsive part of the bicycle.

Figure 5:
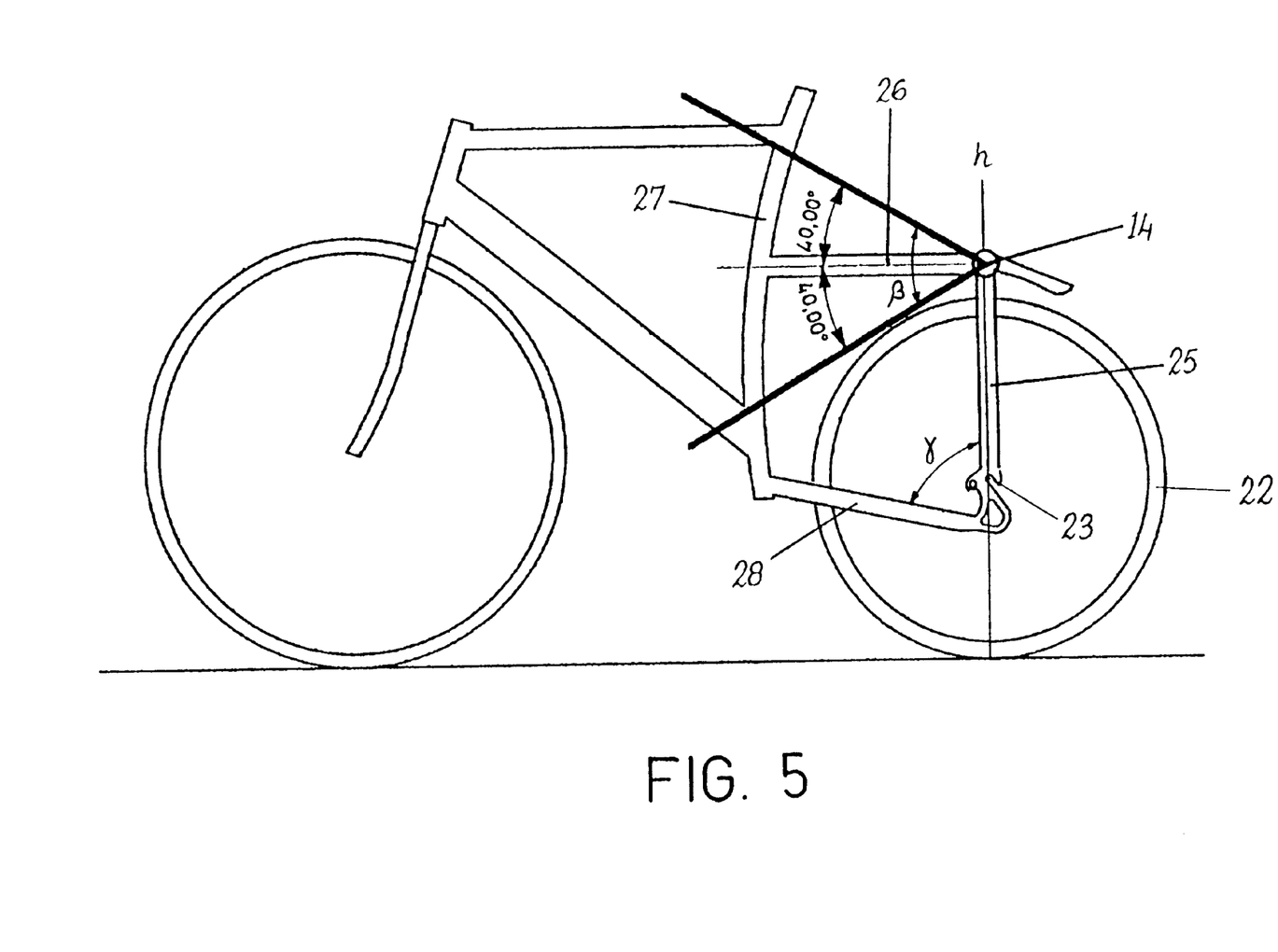
FIG. 5 shows a left lateral view of another bicycle according to the invention.

In another bicycle according to the invention, as better shown in FIG. 5, the frame also provides a second rod 26 connecting the central shaft 14 of the pedal group with the rod 27 supporting the seat, not shown. Such second rod 26 is sloped with an angle β comprised within ±40° with respect to a line parallel to the ground and going through the central shaft 14 of the pedal group. Moreover, the frame provides a further rod 28 connecting the hub 23 of the rear wheel 22 and the lower end of the seat supporting rod 27; the angle γ between such further rod 28 and the line h is preferably comprised within 60° and 120°. Such configuration of the frame enables the bicycle stability to be further increased, minimising the torsional stress of the central shaft 14 of the pedal group.

Figure 6:
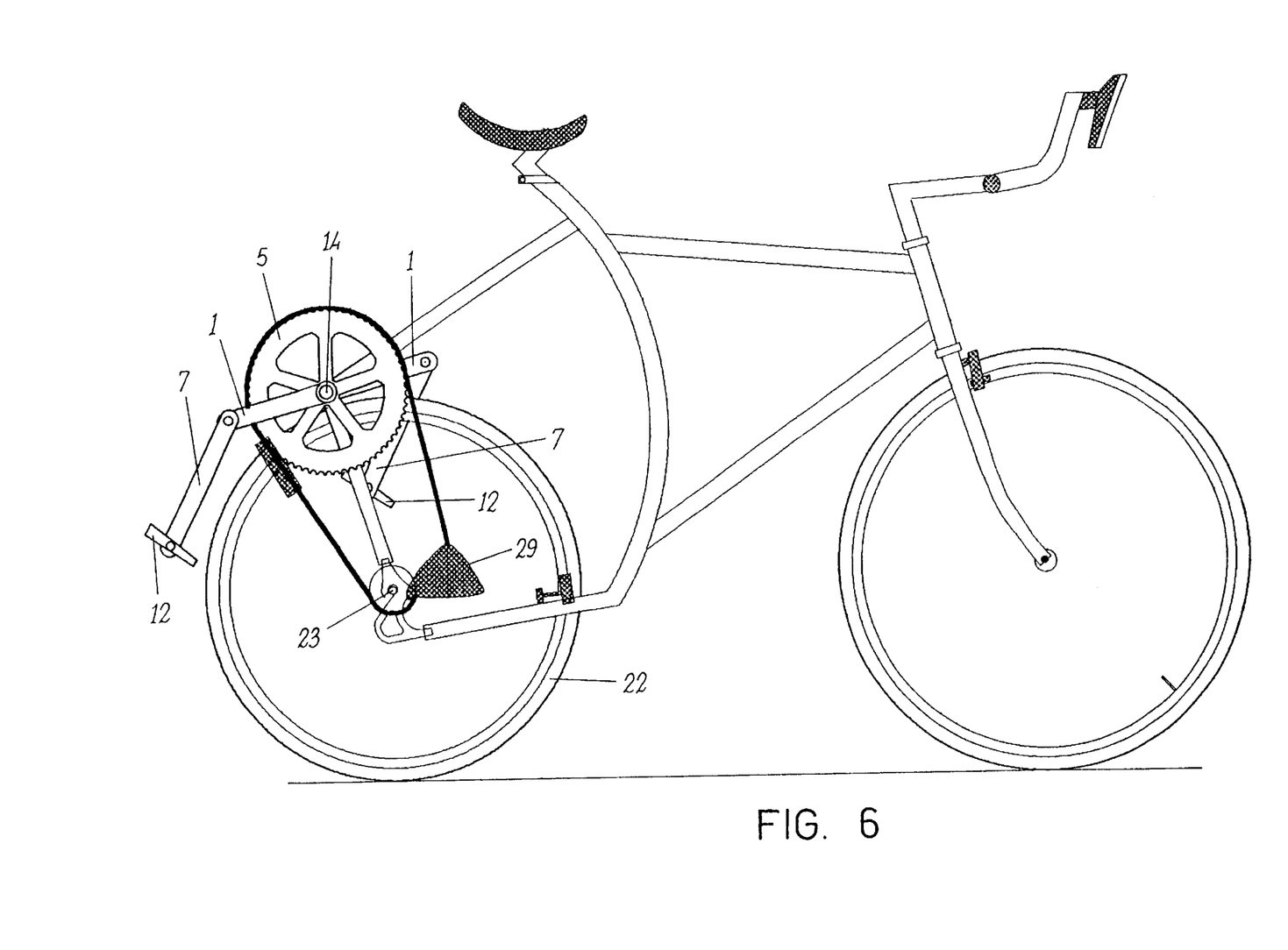
FIG. 6 shows a right lateral view of a bicycle according to the invention obtained combining the solutions shown in FIGS. 1, 3 and 5.

For instance, in FIG. 6 a mobile bicycle is shown comprising the pedal group with cranks and pedal cranks of FIG. 1, a speed gear 29 and the solutions proposed for the frame and shown in FIGS. 3 and 5.

Figure 7:
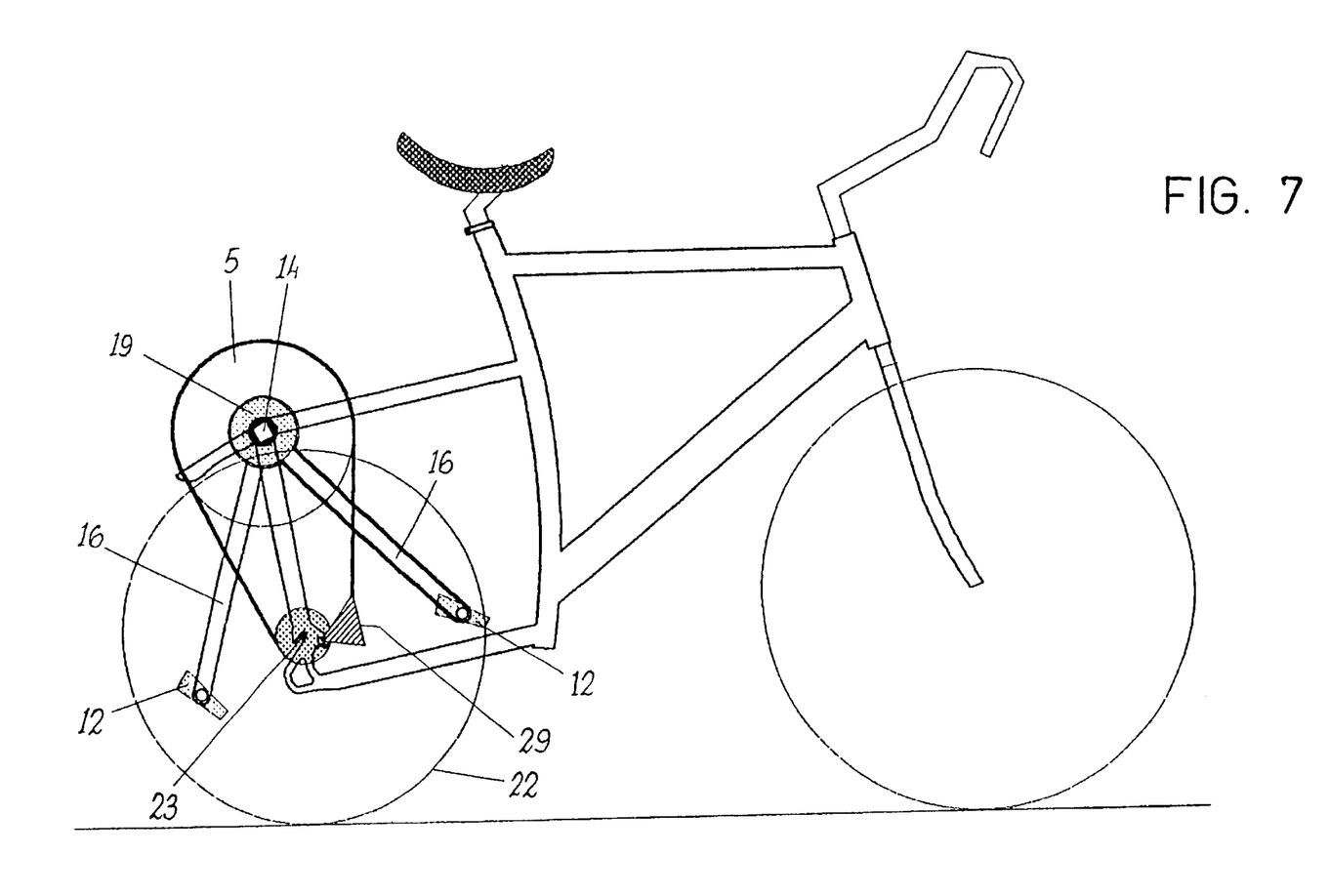
FIG. 7 shows a right lateral view of a bicycle according to the invention obtained combining the solutions shown in FIGS. 2, 3 and 5.

Similarly, in FIG. 7 a mobile bicycle is shown comprising the pedal group with pendulum cranks of FIG. 2, a speed gear 29 and the solutions proposed for the frame in FIGS. 3 and 5.

Figure 8:
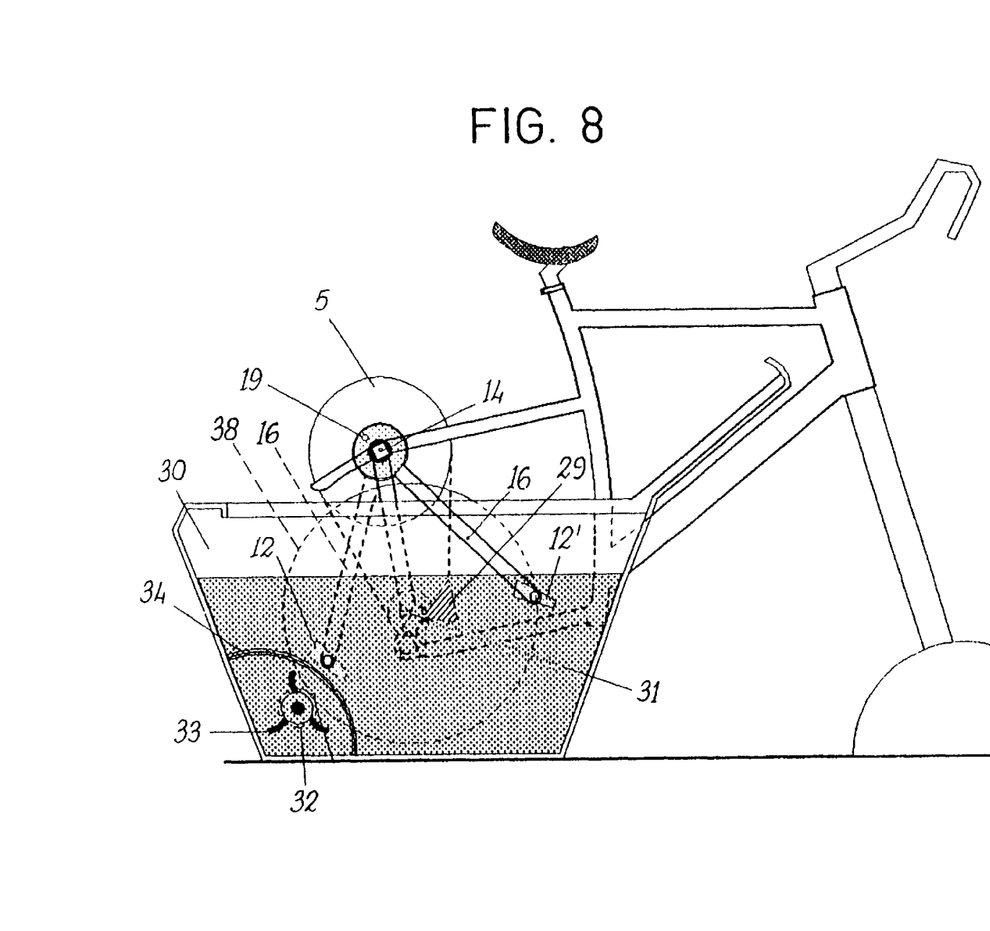
FIG. 8 shows a right lateral view of a third embodiment of a bicycle according to the invention.
Figure 9:
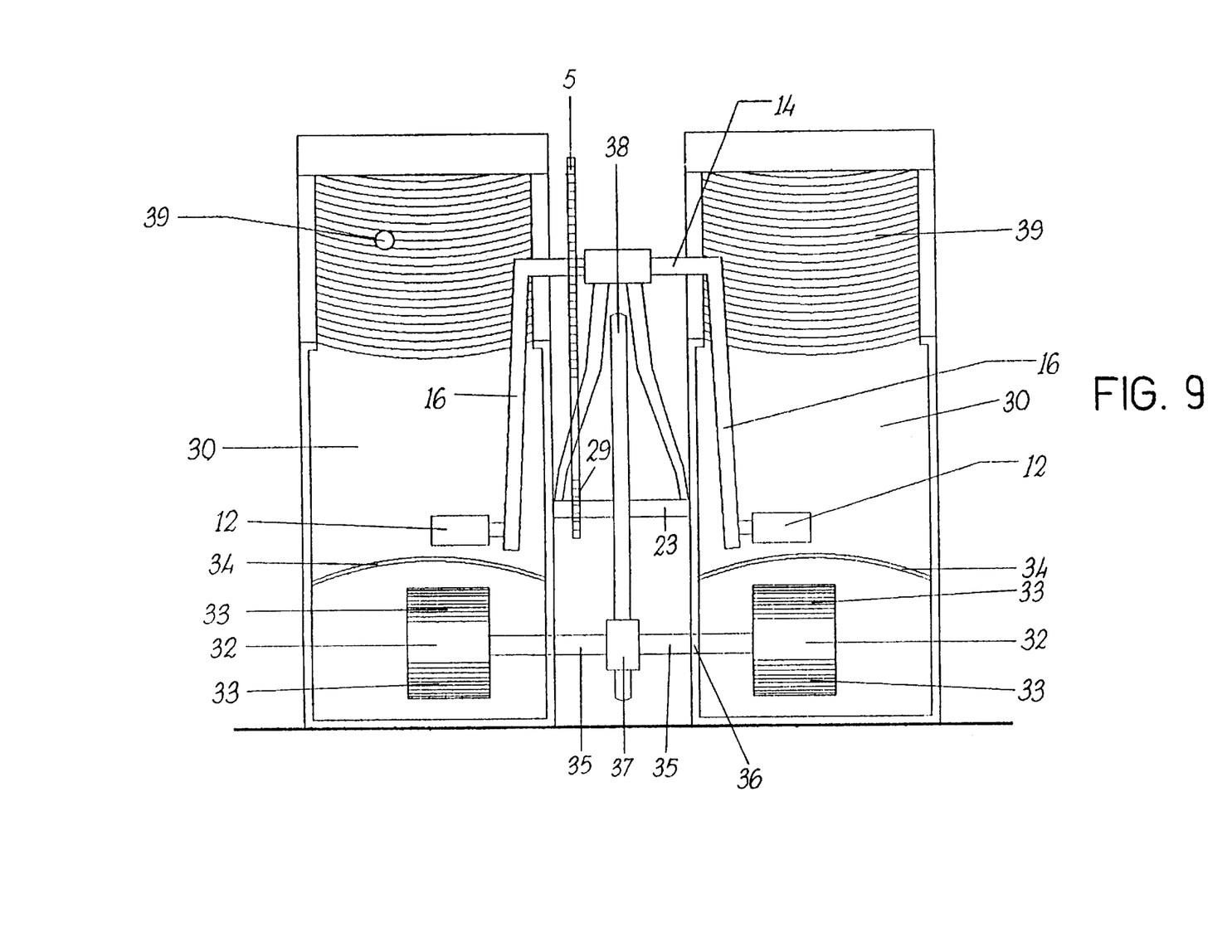
FIG. 9 shows a rear view of the bicycle of FIG. 8.

With reference to FIGS. 8 and 9, a third embodiment of the bicycle according to the invention provides that the bicycle is fixed, provides the pedal group with pendulum cranks 16 of FIG. 2, a speed gear 29, the solutions proposed for the frame in FIGS. 3 and 5 and also comprises two tanks 30, suitable to contain water and/or therapeutical liquids 31, within each of them a pedal 12 being submerged for promoting an efficient hydromassage effect for the user's lower limbs during pedalling. Further embodiments may provide the pedal group with cranks and pedal cranks of FIG. 1, still remaining within the scope of the present invention.

Within each of the two tanks 30 is provided a cylinder 32 provided with shaped blades 33 and protected by a protection grid 34. The two cylinders 32 are integrally coupled each other by a shaft 35 inserted into two wet seal through holes 36 provided on the facing walls of the two tanks 30. The shaft 35 centrally provides a disc 37 having a bigger diameter and interfering with the rear wheel or flywheel 38. Particularly, during the operation of the pedal group, through contact with the disc 37, the rear wheel or flywheel 38 transmits a rotatory motion to the two cylinders 32 the shaped blades 33 of which dash the water or therapeutical liquid 31 upwardly toward the user's lower limbs, enhancing the hydromassage effect. Each one of the two tanks 30 provides a chute 39 for the drainage of liquid 31.

Figure 10:
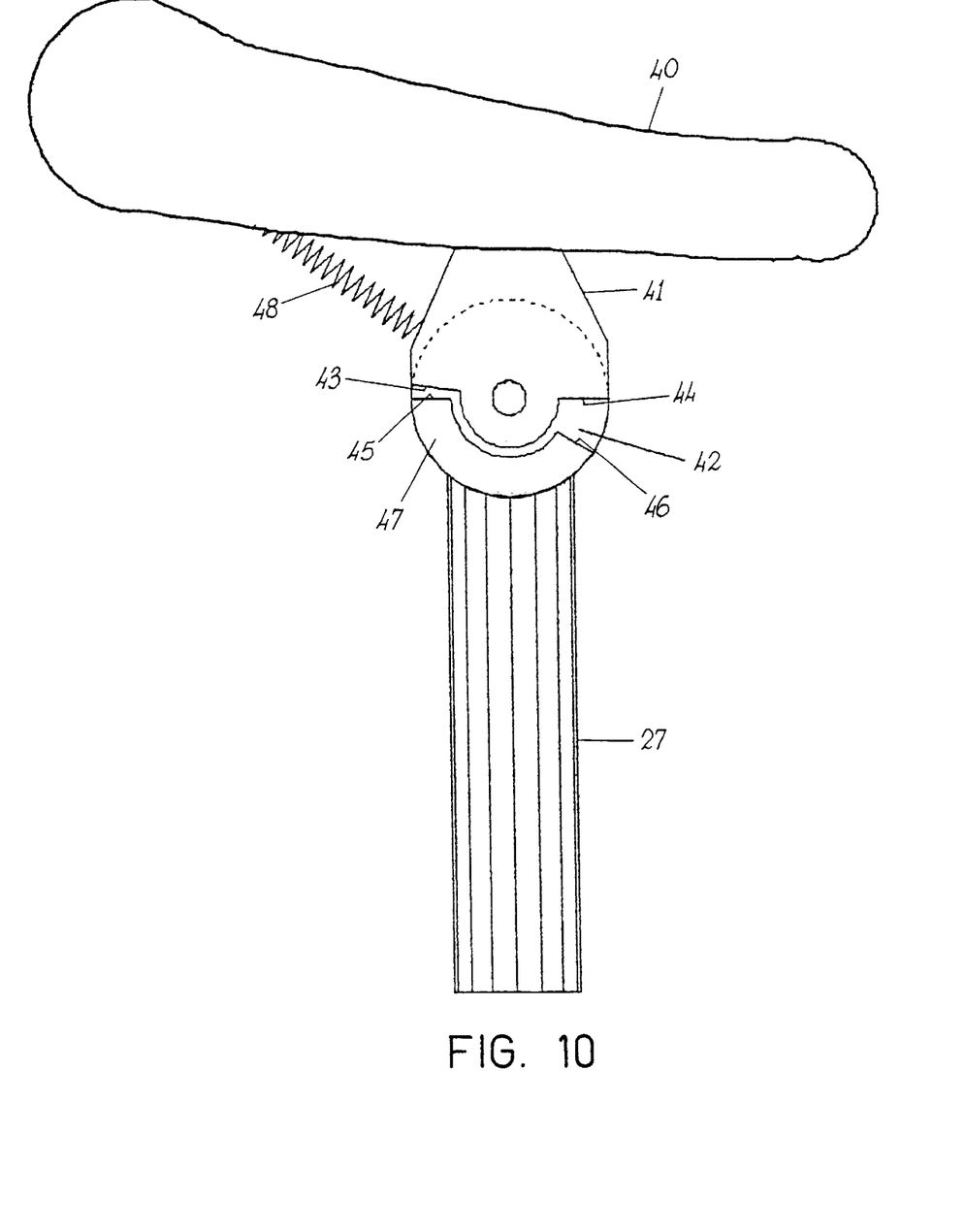
FIG. 10 shows a right lateral view of a fourth embodiment of a bicycle according to the invention.

With reference to FIG. 10, a forth embodiment of the bicycle according to the invention provides a swinging seat 40 having a variable inclination on the supporting rod 27. Particularly, the seat 40 provides a foot 41 pivoted on the head 42 of the supporting rod 27; the foot 41 is suitably shaped for providing two surfaces 43 and 44 interfering with two mating surfaces 45 and 46 of a projection 47 of the head 42 to limit the rotation of the foot 41 on the head 42. A spring 48, connected to the seat 40 and to the head 42 of the supporting rod 27, offers elastic resistance to the swinging of the seat itself.

Figure 11:
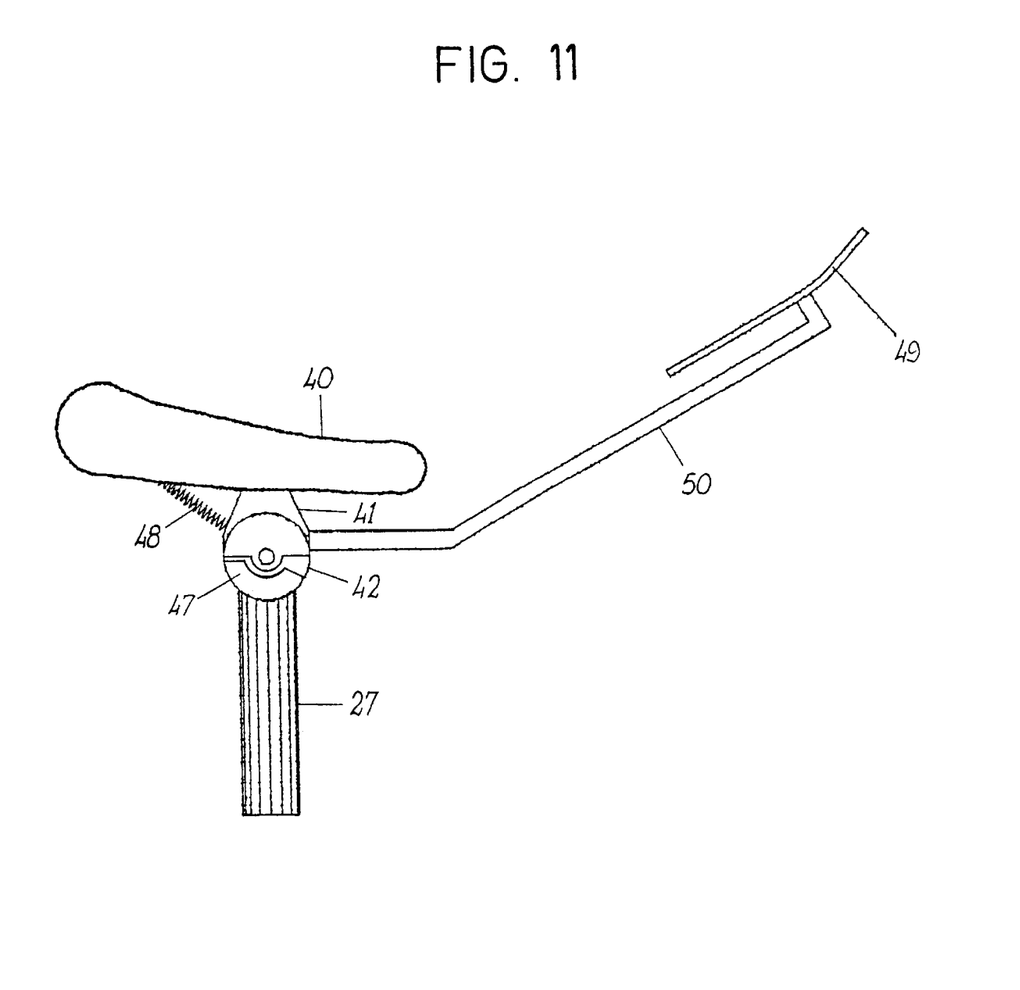
FIG. 11 shows a right lateral view of another embodiment of a bicycle according to the invention.

With reference to FIG. 11, another bicycle according to the invention provides that the balancing seat 40 also comprises a front bodice 49, for supporting the user's bust, connected to the seat 40 through a rod 50 pivoted on the head 42 of the supporting rod 27 or on the foot 41 of the seat 40 through elastically swinging means, not shown, provided with adjustable friction means, also not shown, able to change the elastic resistance offered by the front bodice 49 to the weight of the supported bust. The front bodice 49 is anatomically shaped and padded with soft stuff.

Figure 12:
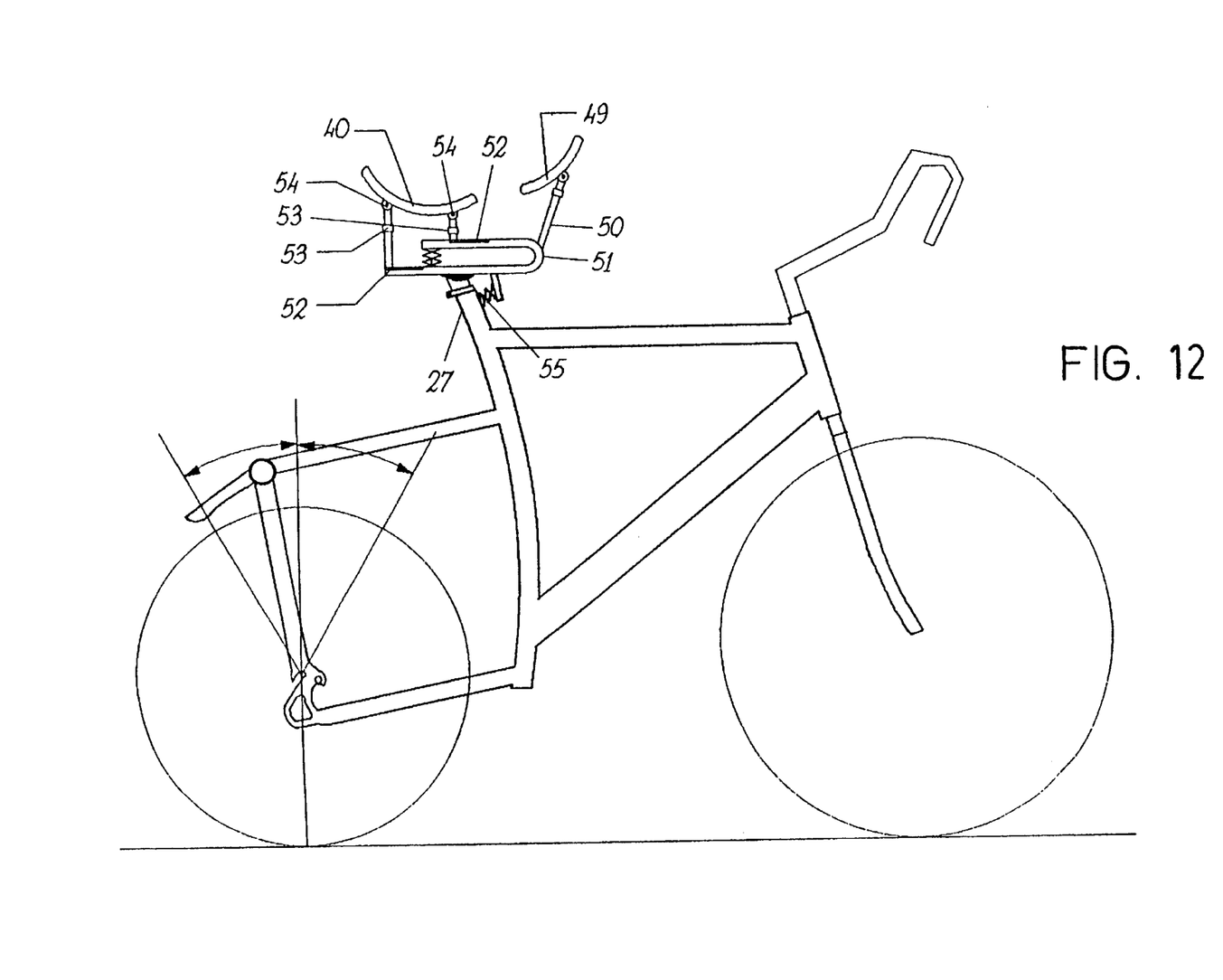
FIG. 12 shows a right lateral view of a further embodiment of a bicycle according to the invention.

With reference to FIG. 12, the foot 41 of the seat 40 of a further bicycle according to the invention may provide an upper element 51, preferably made up of an U-shaped bent plate having unequal arms extending substantially parallel to ground, provided with sliding means 52, for adjusting the seat 40 along the longitudinal direction, with telescopic means 53, for adjusting the seat 40 in height and longitudinal slope, and with articulation means 54, for adjusting the seat 40 in transversal slope. The upper element 51 is also connected through an elastic spring 55 to the supporting rod 27 of the seat 40.

Figure 13:
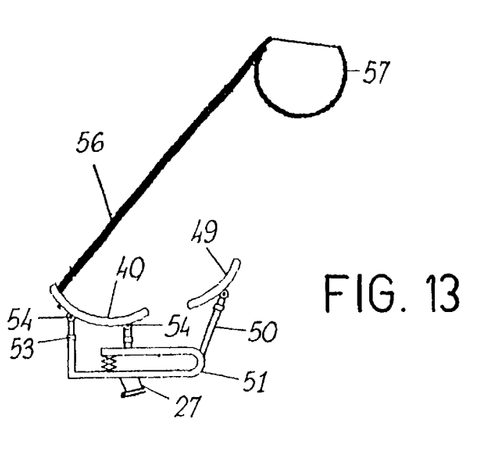
FIG. 13 shows a right lateral view of the seat of another embodiment of a bicycle according to the invention.

With reference to FIG. 13, the seat 40 of another bicycle according to the invention may provide a rear equaliser 56, for supporting the user's bust, connected to the seat 40 or to the supporting rod 27 through quick release elastically swinging means, not shown, provided with adjustable friction means, also not shown, able to change the elastic resistance offered by the equaliser 56 to the weight of the supported bust. The rear equaliser 56 is provided with bust supporting means 57 and may furnish an efficient protection when falls occur.

The present invention has been described for illustrative but not limitative purposes, according to its preferred embodiments, but it is to be understood that modifications and/or changes can be introduced by those skilled in the art without departing from the relevant scope as defined in the enclosed claims.

What is claimed is:

1. A bicycle comprising a rear wheel (22) or flywheel, a pedal group comprising a central shaft (14) and a gear wheel (5) integrally coupled with each other, a left crank (16) and a right crank (16), said left crank (16) and right crank (16) being rotatably coupled at a first end with the central shaft (14) by mechanical means (15, 16, 19) providing a freewheel relationship between each crank (16) and the central shaft (14), and left and right pedals (12) being respectively directly coupled to an opposite end of said pedal cranks (16), and wherein the central shaft (14) of the pedal group, which is placed parallel with respect to a hub of rear wheel (22), is provided externally, above, with respect to the circumference of said rear wheel (22), within an angle (α) between ±30° with respect to a line (h) passing through a contact point between the wheel (22) and the ground and the hub (23).

2. Bicycle according to claim 1, wherein said rotating coupling mechanical means between each one of the cranks (16) and the central shaft (14) comprises a gear (18) coupled with the crank (16) or to the end (15) of the central shaft (14), and provided with a shaped hole (19) within which a corresponding end (15) of the central shaft (14) is inserted.

3. Bicycle according to claim 1, further comprising at least one seat coupled with a supporting rod, said at least one seat being a swinging seat (40) having a foot (41) pivoted on a head region (42) of the supporting rod (27), the foot (41) being shaped in such a way to provide two surfaces (43, 44) interacting with two mating surfaces (45, 46) of a projection of the head region (47) to limit foot rotation with respect to head (42) of the supporting rod (27), and elastic means (48, 55) being connected with the seat (40) and the supporting rod (27).

4. Bicycle according to claim 3, wherein said at least one swinging seat (40) comprises a front bodice (49) to support a user bust, said bodice (49) being provided with elastically swinging means.

5. Bicycle according to claim 4, wherein the front bodice (49) comprises a rod (50), pivoted on the head (42) of the supporting rod (27) and/or on the foot (41) of the seat (40) by said elastically swinging means.

6. Bicycle according to claim 4, with said elastically swinging means being provided with adjustable friction means able to vary elastic resistance opposed by the front bodice (40) to the weight of a supported bust.

7. Bicycle according to claim 3, wherein said at least one swinging seat (40) comprises sliding means (52) to adjust a main body of the seat (40) along a longitudinal direction of the bicycle.

8. Bicycle according to claim 3, characterized in that said at least one swinging seat (40) comprises a rear equalizer (56) to support a user bust, said equaliser (56) being provided with elastically swinging means.

9. Bicycle according to claim 8, wherein the rear equaliser (56) is connected with a main body of the seat (40) or with the supporting rod (27) by elastically swinging means.

10. Bicycle according to claim 8, wherein said elastically swinging means comprises a quick release means.

11. Bicycle according to claim 8, wherein said elastically swinging means comprises adjustable friction means which varies elastic resistance opposed by the equalizer (56) to a user bust.

12. Bicycle according to claim 1, wherein the central shaft (14) of the pedal group, which is placed parallel with respect to a hub of rear wheel (22), is provided externally, above, with respect to the circumference of said rear wheel (22), within an angle (α) between ±30° with respect to a line (h) passing through a contact point between the wheel (22) and the ground and the hub (23).

13. Bicycle according to claim 1, wherein the rear wheel (23) or flywheel hub is connected with the central shaft (14) of the pedal group by a first rod (25).

14. Bicycle according to claim 13, further comprising a seat supporting rod (27) and a second rod (26), with the second rod being connected to the central shaft (14) of the pedal group and with the seat supporting rod (27), said second rod (26) being included within an angle (β) between ±40° with respect to a line parallel to the ground and passing through the central shaft (14) of the pedal group.

15. Bicycle according to claim 13, further comprising a seat supporting rod (27) and a second rod (28) connecting the hub of rear wheel (22) or flywheel with a lower end of the seat supporting rod (27), the angle (γ) between said second rod (28) and the line (h) perpendicular to the ground and passing through the hub (23) of the rear wheel (22) or flywheel being between 60 and 120°.

16. The bicycle as recited in claim 1 wherein said rotating coupling mechanical means between each one of the cranks (16) and the central shaft (14) comprises a gear (18) coupled with the crank (16) or to the end (15) of the central shaft (14), and with said gear being provided with a crank pin dimensioned for receipt by a reception cavity of said drive shaft.

17. Bicycle according to claim 1, wherein said mechanical means is a freewheel positioned at said drive shaft, and said left and right cranks being unitary members with the first end of one of said left and right cranks being positioned at a junction location of said freewheel and drive shaft, and each of said pedals comprising a foot rest and a rotation shaft extending along an axis of rotation of said foot rest with a rotation shafts extending into contact with respective opposite ends of said left and right pedal cranks.

18. Bicycle according to claim 1, wherein each of said left and right cranks is a single lever with the first end of each lever positioned at a junction region of said freewheel mechanism and drive shaft and the opposite end of each lever directly connected to a respective one of said pedals, and, with said left and right cranks being dimensioned such that each respective pedal follows a segmented circle path as part of a repeating pendulum pedal motion.

19. A bicycle, comprising:
a wheel hub or flywheel hub;
a frame having a seat reception bar and a wheel or flywheel hub support bar positioned rearward of said seat reception bar;
a seat received by said seat reception bar;
a pedal group operatively connected, via a force transmitter, to turn the wheel or flywheel hub, the pedal group including,
a central shaft having a first end and a second end,
a gear wheel in driving engagement with the central shaft and in contact with said force transmitter,
a first pedal,
a second pedal,
a first pedal crank supporting said first pedal,
a second pedal crank supporting said second pedal,
first interconnection means for drivingly interconnecting said first pedal crank to the first end of said shaft, with said first interconnection means including a freewheel mechanism positioned at a junction of said first pedal crank with said shaft,
second interconnection means for drivingly interconnecting said second pedal crank to the second end of said shaft, with said second interconnection means including a second freewheel mechanism positioned at a junction of said second pedal crank with said shaft, and said first and second pedals being connected, respectively, to said first and second pedal cranks, and wherein said central shaft is supported by said frame at a location rearward of a rear end of said seat.

20. The bicycle as recited in claim 19 wherein said force transmitter is a chain.

21. Bicycle according to claim 19, wherein said first and second pedal cranks are unitary members with the first end of one of said first and second pedal cranks being positioned at a junction location of said freewheel and drive shaft, and each of said pedals comprising a foot rest portion and a rotation shaft extending along an axis of rotation of said foot rest with the rotation shafts extending into contact with respective opposite ends of said first and second pedal cranks.

22. Bicycle according to claim 19, wherein each of said pedal cranks is a single level with the first end positioned at a junction region of said freewheel mechanism and drive shaft and the opposite end directly connected to a respective one of said pedals, and said pedal cranks being dimensioned such that end pedal follows a segmented circle as part of a repeating pendulum motion.

23. The bicycle as recited in claim 19, wherein said pedals are directly connected, respectively, to said first and second pedal cranks.

24. The bicycle as recited in claim 19 wherein said wheel or flywheel hub is supported on a first end of said wheel or flywheel hub support bar and said shaft is supported at an opposite end of said wheel or flywheel hub support bar.

25. The bicycle as recited in claim 24 wherein said frame further comprises a first frame extension bar extending rearward from said seat reception bar to said wheel or flywheel hub support bar, and wherein said shaft is supported at an intersection of said first frame extension bar and said wheel or flywheel support bar.

26. The bicycle as recited in claim 25 wherein said frame further comprises a second frame extension bar extending rearward from said seat reception bar to the first end of said wheel or flywheel hub support bar, and wherein said second frame extension bar is positioned below said first frame extension bar.

27. The bicycle as recited in claim 19 wherein the shaft of the pedal group is positioned within an angle ($\alpha$) between $\pm 30°$ with respect to a line (h) passing through a contact point between a rear wheel of the bicycle with the ground and the wheel hub of that rear wheel.

28. The bicycle as recited in claim 19 wherein said pedal group is arranged on said frame such that said pedals travel along a pendulus travel path that has a forward limit positioned rearward of said seat reception bar.

29. The bicycle as recited in claim 19 wherein said pedalgroup is dimensioned and arranged on said frame such that pedal support ends of said first and second cranks in use, travel only within a circumference defined by a rear wheel of said bicycle during a complete travel path of said pedal support ends.

30. A bicycle, comprising:
a wheel hub or flywheel hub;
a frame having a seat reception bar and a wheel or flywheel hub support bar positioned rearward of said seat reception bar,
a pedal group operatively connected, via a force transmitter, to turn the wheel of flywheel hub, the pedal group including,
a central shaft having a first end and a second end,
a gear wheel in driving engagement with the central shaft and in contact with said force transmitter,
a first pedal,
a second pedal,
a first pedal crank supporting said first pedal,
a second pedal crank supporting said second pedal,
first interconnection means for drivingly interconnecting said first pedal crank to the first end of said shaft, with said first interconnection means including a freewheel mechanism positioned at a junction of said first pedal crank with said shaft,
second interconnection means for drivingly interconnecting said second pedal crank to the second end of said shaft, with said second interconnection means including a second freewheel mechanism positioned at a junction of said second pedal crank with said shaft, and said first and second pedals being connected, respectively, to said first and second pedal cranks, and
wherein said pedal group is arranged on said frame such that said pedals travel along a pendulus travel path that has a forward limit posotioned rearward of said seat reception bar.

31. The bicycle as recited in claim 30 wherein said extension shafts each have a central axis defining an axis of rotation for a respective one of said foot contact members.

32. The bicycle as recited in claim 31 wherein said extension shafts extend through a through hole formed in a respective one of said pedal cranks.

33. The bicycle as recited in claim 30 wherein said first and second pedals each include a foot contact member and an extension shaft (13) extending from the foot contact member and into contact with a respective one of said first and second pedal cranks.

34. The bicycle as recited in claim 30 wherein said pedal group is dimensioned and arranged on said frame such that pedal support ends of said first and second cranks travel only within a circumference defined by a rear wheel of said bicycle during the pendulus path.

35. The bicycle as recited in claim 30, wherein said pedals are directly connected, respectively, to said first and second pedal cranks.

36. The bicycle as recited in claim 30 wherein said wheel or flywheel hub is supported on a first end of said wheel or flywheel hub support bar and said shaft is supported at an opposite end of said wheel or flywheel hub support bar.

37. The bicycle as recited in claim 36 wherein said frame further comprises a first frame extension bar extending rearward from said seat reception bar to said wheel or flywheel hub support bar, and wherein said shaft is supported at an intersection of said first frame extension bar and said wheel or flywheel support bar.

38. The bicycle as recited in claim 37 wherein said frame further comprises a second frame extension bar extending rearward from said seat reception bar to the first end of said wheel or flywheel hub support bar, and wherein said second frame extension bar is positioned below said first frame extension bar.

39. A bicycle comprising a rear wheel or flywheel, a pedal group comprising a central shaft and a gear wheel integrally coupled with each other, a left crank and a right crank, said left crank and right crank being rotatably coupled at a first end with the central shaft by mechanical means providing a freewheel relationship between each crank and the central shaft, and left and right pedals being respectively directly coupled to an opposite end of said pedal cranks, and wherein the central shaft of the pedal group, which is placed parallel with respect to a hub of rear wheel, is within an angle ($\alpha$) between $\pm 30°$ with respect to a line (h) passing through a contact point between the wheel and the ground and the hub.

40. The bicycle as recited in claim 39 wherein the hub is supported on a first end of a wheel hub support bar of a frame of said bicycle and said shaft is supported at an opposite end of said wheel hub support bar.

41. The bicycle as recited in claim 39 further comprising a seat support bar forming a portion of a frame of said bicycle supporting said pedal group and wherein said shaft is supported by said frame at a location rearward of a rear end of said seat.

* * * * *